Jan. 20, 1953     J. F. MORGAN     2,625,754
DITCH FORMING PLOW
Filed April 6, 1948     2 SHEETS—SHEET 1
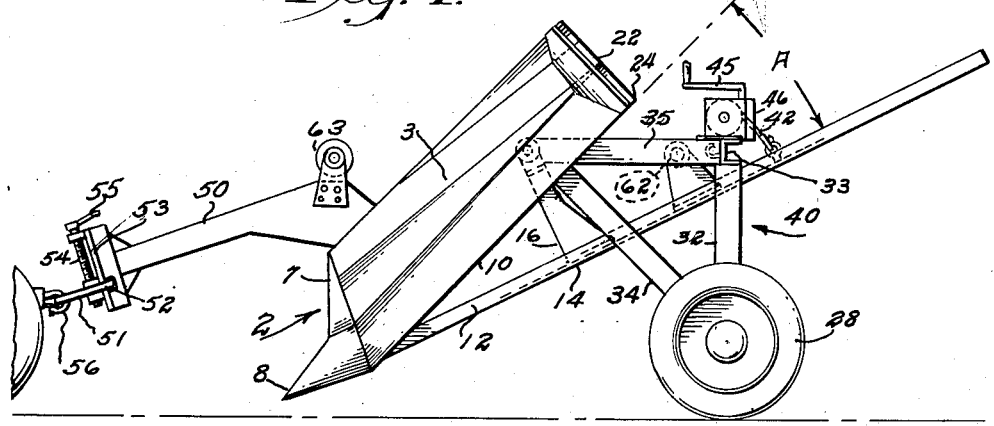
Fig. 1.
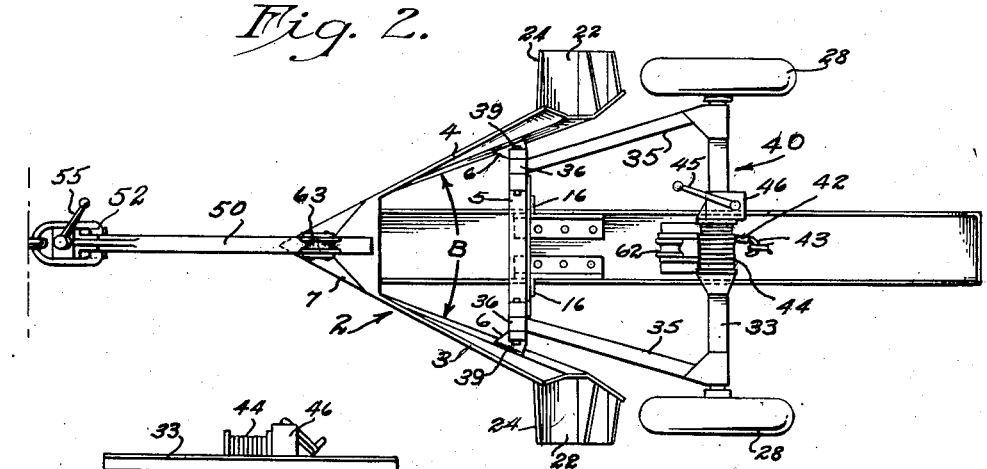
Fig. 2.
Fig. 3.
INVENTOR.
John F. Morgan
BY Scott L. Norvil
ATTORNEY Jan. 20, 1953  J. F. MORGAN  2,625,754
DITCH FORMING PLOW
Filed April 6, 1948  2 SHEETS—SHEET 2
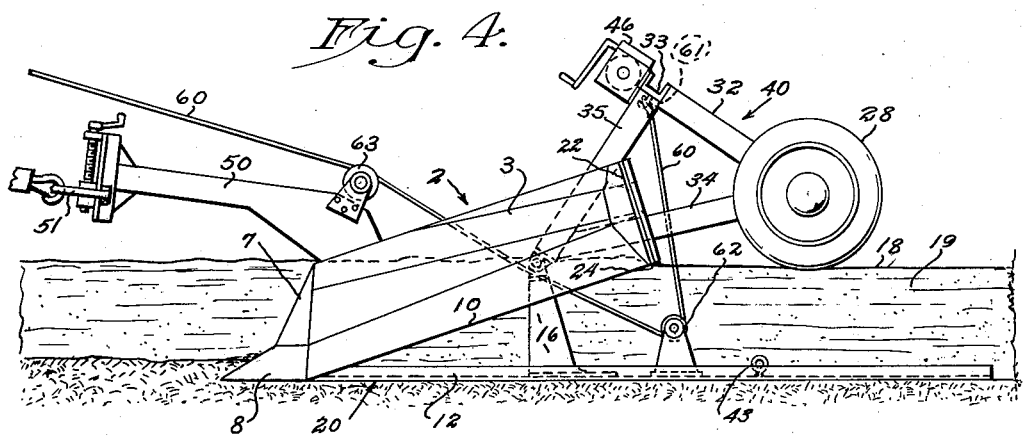
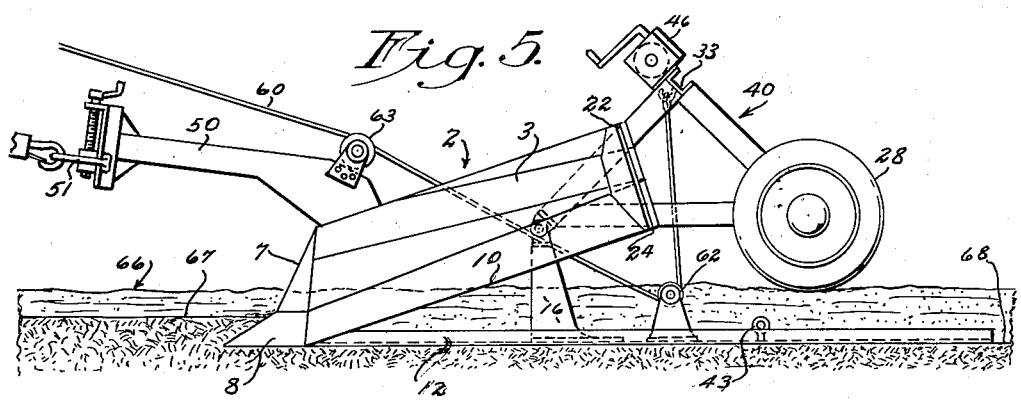
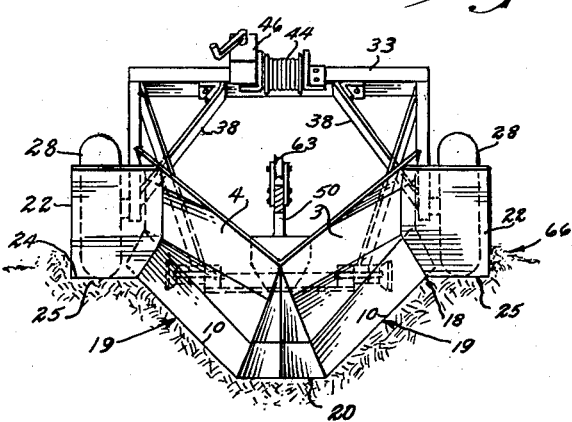
INVENTOR.
John F. Morgan
BY Scott L. Norvell
ATTORNEY Patented Jan. 20, 1953

2,625,754

UNITED STATES PATENT OFFICE 2,625,754

DITCH FORMING PLOW

John F. Morgan, Tolleson, Ariz., assignor to Fullerform, Inc., Tolleson, Ariz.

Application April 6, 1948, Serial No. 19,407

6 Claims. (Cl. 37—98)

This invention relates to irrigation ditch-forming plows.

Heretofore, irrigation ditches have been formed by terracing machines and certain types of plows, but in each case, the size and shape of the ditch depended on the option and skill of the operator. Unless the plow blades were specially formed no uniformity as to size and shape could be assured.

In operations where it is necessary to form a ditch of definite size and shape in order to provide a foundation for ditch lining equipment, it is customary to first form an elongated mound of earth called a berm. The ditch is then formed in this berm so that its bed is above the level of the land to be irrigated. A ditch having a flat bottom and outwardly slanting sides of uniform slant and height is best suited to lining. It is also desirable to have the sides adjoin level banks bearing a definite relation to the ditch bottom.

In order to form a ditch to meet the above requirements, I have developed a plow which has for its objects:

First, the provision of a plow which will attack the earth and move it equally to each side of a center cut and level the moved earth smoothly on each side of the cut;

Second, the provision of a double bladed V plow having a centrally positioned riding shoe to guide its direction of cut and form a depth-of-cut limiting element;

Third, the provision of a double bladed V plow having a centrally positioned flat riding shoe on its bottom, and laterally positioned running wheels adapted to gage its depth of cut;

Fourth, the provision of a V plow having a centrally positioned longitudinal riding shoe, laterally positioned running wheels pivotally mounted and operative to raise the plow body above ground level for transport, and to lower it as desired to control and limit the depth of cut; and Fifth, to provide a V shaped double bladed ditch forming plow with side wings extending outward from the blades to level off the ditch bank on each side of the furrow, after the furrow has been cut to a predetermined depth.

Other objects will appear hereinafter.

I attain the foregoing objects by means of the device, structure, and cooperating parts illustrated in the accompanying drawings, in which—

Figure 1 is a side elevation of the plow in running position for transport;

Figure 2, a plan view thereof;

Figure 3, a rear elevation of the plow as it would appear in a substantially completely formed ditch;

Figure 4, a side elevation thereof;

Figure 5, a side elevation of the plow with the blades partially lowered as it would appear taking a shallow cut thru a ditch berm; and Figure 6, a front elevation of the plow taking a cut of substantially the same depth as that shown in Figure 3.

Similar numerals refer to similar parts in the several views.

The plow body 2 consists essentially of two blades 3 and 4, arranged to mutually converge in V relation, and secured in position by the transverse frame member 5, and angular blocks 6. Toward the front of the plow body these blades are brought toward each other at a more abrupt angle to form the nose 7, and below this a sharper angular point 8 of hardened steel is formed. From the point, and extending beneath and angularly rearward relative to the cutting edges 10 of blades 3 and 4, is a shoe 12 having a channel-like section and a flat bottom face 14. This is secured to transverse frame member 5 by stanchions 16 at about the middle of its length, and is welded into the bottom of the nose point 8 at its front end.

The angle A, taken in a vertical plane, between the bottom face 14 of shoe 12 and the cutting edges 10 of the blades, is such that the blades have a sufficient upward slant to extend from the bottom 20 of the ditch 17 to the top edges 18 of its sides 19, while the horizontal angle B between the blades 3 and 4 is such that they extend from the edges of the flat bottom 20 of the ditch 17 to and beyond its top edges.

The combined upward outward and rearward slant of the blades 3 and 4 is arranged to produce the desired upward and outward slant of the ditch sides 19, and this angular slant, together with its flat bottom 20 formed by shoe 12 produce the general contour of the ditch as shown in Figures 3 and 6.

Near the rear ends of each blade substantially vertical side wings 22 are attached. These wings have a slight rearward pitch to move earth outward as it is crowded upward and outward by the forward movement of the blades 3 and 4. Cutting edges 24 of these wings are parallel to the bottom face 14 of shoe 12 and are spaced above this bottom face a distance equivalent to the vertical depth of the ditch to be formed.

A draw bar 50 is attached to and extends forward from the upper part of nose piece 7. At its front end the latch tongue 51 is attached to a slide block 52 which slides on ribs 53. Block 52 can be raised and lowered by screw 54 turned by crank 55. This mechanism can be used to adjust the vertical position of the tongue 51, relative to the tractor hitch 56.

Plow body 2 is raised for transport as shown in Figure 1 and lowered to cutting position as shown in Figures 4 and 5 by a wheel frame 49 supported by running wheels 28. This frame consists of vertical side members or legs 32 joined at the top by a cross bar 33, lateral angularly extending braces 34 and horizontal stretchers 35. These members form two well braced laterally positioned triangular frames which are tied together by transversely extending member 5 and cross bar 33. Bearings 36 are formed on stretchers 35 at their forward ends and are journalled on pins 39 which are attached to frame member 5. Transverse braces 38 extend from the bottoms of legs 32 to a mid-position on cross bar 33 to complete bracing of wheel legs 32.

The wheel frame 40 swings on bearings 36, and with the wheels resting on the ground at a point intermediate the ends of the shoe 12, the plow frame may be raised, as shown in Figure 1, or lowered as shown in Figure 4 with the intermediate portion of the shoe passing through the axis of rotation of the wheels. When the plow is attached to a light tractor for transport, the plow body 2 is raised by a cable 42 attached to eye 43 on the upper face of shoe 12. This cable winds on winch drum 44, operated by hand crank 45 through gears in box 46.

When the plow is operated it is drawn by a caterpillar tractor, or the like. Cable 42 is then disconnected, and cable 60 attached to a hook 61 on the cross bar 33 of wheel frame 40. This cable extends downward and under sheave 62 mounted on the upper face of shoe 12, thence upward and over a sheave 63 to a cable drum on the tractor (not shown).

Power driven cable drums are now included as standard equipment on most tractors, and are controllable from the tractor operator's seat. Therefore pulling on or taking in cable 60 will raise the plow body 2 and cause it to ride on wheels 28 of frame 40; conversely, paying out cable 60 will permit the wheel frame to raise and lower the plow body.

In use, the plow is drawn along a berm 66. The first cut or pass is comparatively shallow and only the plow point 8 is lowered to cutting position. In making this cut, the shoe extends upward and rearward relative to the top surface of the berm and with the rear end of the shoe at all times extending beyond the ground contact point of the wheels, lowered only slightly from the position shown in Figure 1. This first cut opens up a furrow to the depth indicated by line 67 (Figure 5). The next cut is made with the shoe 12 riding substantially horizontal on the bottom 68 of the furrow as shown in this figure. The wheels 28 ride on the banks of the furrow which now takes the form of a flat bottomed ditch with outwardly slanting side walls. Third and final cuts are then taken as shown in Figures 3, 4, and 6. In taking these cuts the wheels are raised further and the plow body lowered more and more with its weight carried increasingly on shoe 12. As the final cuts are made, the wings 22 cut and scrape the top surface of ditch banks 25 and provide a smooth top surface and definitely formed top edges 18.

The tractor tracks are spaced to run on banks 25, and, as the ditch is formed, these banks are packed down and compressed. The result is that a ditch of uniform size with a flat bottom, outwardly slanting sides, and compact horizontal banks is formed along the berm. This type of ditch has been found well suited to lining with either concrete or asphalt compositions, and can be quickly and easily formed at a minimum cost.

While I have illustrated and described one form of my plow, it will be understood that this form is subject to many modifications both as to its general form as well as the shape and size of its component parts, therefore it is intended that the following claims be given a broad interpretation.

I claim:

1. A ditch forming plow having a body including a nose, a triangular point therebelow, a shoe fixed to said point extending rearwardly therefrom, a pair of blades extending upwardly and rearward and diverging outwardly from said nose, a cross bar extending transversely between the rear portion of said blades, a wheel frame having rearwardly extending stretcher bar legs extending downward from the rear ends thereof, riding wheels having ground contact points intermediate the ends of said shoe journaled on the lower portions of said legs, a pivotal connection between said legs and said cross bar located intermediate said point and said wheels at the forward ends of said stretcher bars, a cable connecting said shoe to said wheel frame operative to draw said shoe upward therein, a draw bar fixed to the nose portion of said blades and extending forward to a tongue vertically slidable thereon, and means for supporting said tongue on a towing tractor.

2. In a ditch forming plow, a draw bar, a pivotal hitch connection for supporting said draw bar on a towing tractor, a pair of laterally spaced riding wheels, a wheel frame journaled on said wheels and straddling the ditch to be formed, a pivot connection between said wheel frame and said draw bar located at a point intermediate said hitch connection and said wheels, means for relatively rocking said wheel frame and said draw bar about said pivot connection, a plow rigidly fixed to said draw bar, and a riding shoe rigidly fixed to and extending rearwardly from said plow beyond the ground contact point of said wheels so as to swing an intermediate portion of said riding shoe through the axis of rotation of said wheels by the relative rocking movement of said wheel frame and draw bar about said pivot connection.

3. A ditch forming plow comprising, a draw bar, a pivotal hitch connection for supporting said draw bar on a towing member, a pair of laterally spaced riding wheels adapted to roll along each side of the ditch to be formed fixed to said ditch forming plow through a wheel frame journaled on said wheels, a pivotal connection between said wheel frame and said draw bar, and means for relatively swinging said wheel frame and draw bar about said pivotal connection, a plow share rigidly fixed to said draw bar, a plow point fixed on said plow share intermediate said hitch connection and said pivotal connection, and a riding shoe rigidly connected to said plow share and extending rearwardly thereof so that the ground contact point of said wheels is located intermediate said plow point and the rear end of said riding shoe.

4. A ditch forming plow comprising, a draw bar, a pivotal hitch connection for supporting said draw bar on a towing member, a pair of laterally spaced riding wheels adapted to roll along each side of the ditch to be formed fixed to said ditch forming plow through a wheel frame journaled on said wheels, a pivotal connection between said wheel frame and said draw bar, means for relatively swinging said wheel frame and draw bar about said pivotal connection, a plow share rigidly fixed to said draw bar, a plow point fixed on said plow share intermediate said hitch connection and said pivotal connection, a riding shoe rigidly connected to said plow share and extending rearwardly thereof so that the point of ground contact of said wheels is located intermediate said plow point and the rear end of said riding shoe, side wings on said plow share, and cutting edges on said wings located in the path of the tread of said wheels and positioned in front of said wheels and behind said pivotal connection between said draw bar and said wheel frame.

5. In a ditch forming plow mechanism, a draw bar, a pivotal hitch connection for supporting said draw bar on a towing means, riding wheels fixed to said ditch forming plow through a wheel frame journaled on said riding wheels, a pivotal connection between said frame and said draw bar, a plow rigidly fixed to said draw bar, a plow point fixed on said plow located between said pivotal connection and said hitch connection, a riding shoe rigidly fixed to said plow and extending rearwardly beyond the point of contact of said wheels with the ground surface, and means for relatively swinging said wheel frame and draw bar about said pivotal connection to move said plow and riding shoe to and from digging position.

6. In a ditch forming plow mechanism, a draw bar, a pivotal hitch connection for supporting said draw bar on a towing means, riding wheels, a wheel frame journaled on said riding wheels, a pivotal connection between said frame and said draw bar, a plow rigidly fixed to said draw bar, a plow point fixed on said plow located between said pivotal connection and said hitch connection, a riding shoe rigidly fixed to said plow and extending rearwardly beyond the point of contact of said wheels with the ground surface, means for relatively swinging said wheel frame and draw bar about said pivotal connection to move said plow and riding shoe to and from digging position, and vertical adjusting means between said pivotal hitch connection and said draw bar for vertically adjusting the front end of said draw bar to any supporting position relative to said hitch connection.

JOHN F. MORGAN.

REFERENCES CITED

The following references are of record in the file of this patent:

UNITED STATES PATENTS

| Number | Name | Date |
|---|---|---|
| Re. 17,117 | Martin | Oct. 23, 1928 |
| 321,898 | Humphreys | July 7, 1885 |
| 1,221,848 | Engelbrecht | Apr. 10, 1917 |
| 2,018,138 | Le Tourneau | Oct. 22, 1935 |
| 2,033,168 | Wright | Mar. 10, 1936 |
| 2,223,479 | Byrnes | Dec. 3, 1940 |
| 2,224,047 | Grohs | Dec. 3, 1940 |
| 2,374,312 | Tackett | Apr. 24, 1945 |
| 2,453,723 | Palmer et al. | Nov. 16, 1948 |